United States Patent
Mettälä et al.

(10) Patent No.: US 7,570,668 B2
(45) Date of Patent: Aug. 4, 2009

(54) DATA SYNCHRONIZATION

(75) Inventors: Riku Mettälä, Tampere (FI); Jussi Piispanen, Tampere (FI); Mikko Sahinoja, Tampere (FI); Ari Sutinen, Tamepre (FI)

(73) Assignee: Nokia Corporation, Espoo (FI)

( * ) Notice: Subject to any disclaimer, the term of this patent is extended or adjusted under 35 U.S.C. 154(b) by 1637 days.

(21) Appl. No.: 09/971,213

(22) Filed: Oct. 3, 2001

(65) Prior Publication Data
US 2003/0081557 A1    May 1, 2003

(51) Int. Cl.
*H04L 9/12* (2006.01)
(52) U.S. Cl. .................. 370/507; 370/509; 709/228
(58) Field of Classification Search ............ 370/252, 370/350, 470, 472, 503, 507, 509, 465; 375/145, 375/149, 240.28, 363–366; 709/227, 228
See application file for complete search history.

(56) References Cited

U.S. PATENT DOCUMENTS

| | | | | |
|---|---|---|---|---|
| 5,379,296 A | * | 1/1995 | Johnson et al. | 370/402 |
| 6,564,267 B1 | * | 5/2003 | Lindsay | 709/250 |
| 6,839,564 B2 | * | 1/2005 | Sutinen et al. | 455/502 |
| 2002/0081995 A1 | * | 6/2002 | Leppinen et al. | 455/412 |
| 2003/0045311 A1 | * | 3/2003 | Larikka et al. | 455/466 |
| 2003/0087219 A1 | * | 5/2003 | Berger et al. | 434/118 |
| 2006/0004922 A1 | * | 1/2006 | Lahti et al. | 709/227 |

OTHER PUBLICATIONS

WAP™ WSP, WAP-230-WSP, Approved Version 2001, "Wireless Application Protocol, Wireless Session Protocol Specification."
"IrDA Object Exchange Protocol", Infrared Data Association, 1999, Version 1.2.
"SyncML Representation Protocol, version 1.0", 2000.

* cited by examiner

*Primary Examiner*—Wing F Chan
*Assistant Examiner*—Duc T Duong
(74) *Attorney, Agent, or Firm*—Perman & Green, LLP

(57) ABSTRACT

The invention relates to a method of limiting the size of synchronization messages between a first synchronization device and a second synchronization device. The first device specifies a maximum message size for synchronization messages to be sent to the first device and transmits information on the maximum message size to the second device. The second device transmits to the first device one or more synchronization messages which are equal to or smaller than the maximum message size of the first device.

28 Claims, 3 Drawing Sheets

DATA SYNCHRONIZATION

BACKGROUND OF THE INVENTION

The invention relates to data synchronization between two or more synchronization devices, particularly to limiting the size of synchronization messages during a synchronization session. Data synchronization is an operation in which a correspondence between at least two data collections is created in such a way that after the synchronization the units of the data collections substantially correspond to each other.

Data of portable terminals, such as portable computers, PDA (Personal Digital Assistant) devices, mobile stations or pagers, can be synchronized with network applications, desktop computer applications or other databases in a telecommunications system. Data of calendar and e-mail applications, in particular, are synchronized. Synchronization has previously been based on different proprietary protocols which are not compatible with each other. This restricts the use of terminal or data types and often causes problems to the user. In mobile communication, in particular, it is important to acquire and update data irrespective of the terminal or application used.

The SyncML (Synchronization Markup Language), which is based on the XML (Extensible Markup Language) has been provided for improved synchronization of application data. The SyncML synchronization protocol using messages in the SyncML format (SyncML messages) allows synchronization of data in any application between any networked terminals. For example, a calendar entry in a mobile station is automatically synchronized with the network calendar used by a company secretary.

FIG. 1 shows an example of synchronization where a mobile station MS functions as the SyncML client terminal and a network server S functions as the SyncML server. The SyncML synchronization service comprises first initializing a synchronization session during which e.g. the database to be synchronized is selected. The SyncML client terminal MS synchronization application layer functions are provided by a synchronization client agent, which implements the SyncML protocol inter alia by sending a SyncML package (Client Modifications), which includes, in one or more SyncML messages, modifications made after the last synchronization session to the data that is the object of synchronization in the mobile station MS. The SyncML server S synchronization application layer functions are provided by a sync server agent, which controls synchronization, and a synchronization block (Sync Engine). The server usually waits for an initiative for synchronization from the SyncML client (MS). The server S synchronizes the data, i.e. analyses the changes made to the database and client terminal data, and harmonizes it (makes necessary modifications, replacements and deletions). After this, the SyncML server S sends the server modifications back to the SyncML client (MS). The example described above is simple, yet it illustrates the roles of the devices according to the SyncML standard. The SyncML client terminal (MS) is typically a mobile station (MS), a PC (Personal Computer), a laptop, or a PDA device. The SyncML server S is typically a network server or a PC.

The SyncML synchronization protocol operates in both wireless and wired networks and supports several transfer protocols. The SyncML synchronization protocol can be implemented, for example, on top of the HTTP protocol (Hyper Text Transfer Protocol), the WSP protocol (Wireless Session Protocol) of the WAP (Wireless Application Protocol) standard, the OBEX protocol used for cable links, such as the USB (Universal Serial Bus) or RS-232, or for short-range radio frequency (Bluetooth) links or infrared (IrDA) links, on top of a TCP/IP (Transport Control Protocol/Internet Protocol) stack, and also on top of an e-mail protocol (SMTP, Simple Mail Transfer Protocol). There are typically several different transmission media between the devices (MS, S) of a SyncML session, for instance a GSM network providing a wireless connection, and a local area network LAN. Also many transport layer protocols may be used to transfer SyncML messages. Different transmission media and the devices involved in the SyncML session may have different properties, e.g. varying data rates and packet sizes. The SyncML consists of end-to-end transmission of SyncML messages and it has to function even though a plurality of transport layer protocols is used. The devices are not typically aware of the message size they should use when sending synchronization messages to each other. If a device sends a large SyncML message, it is possible that the transport layer is not able to deliver it or a receiving device is not able to process it after it has arrived.

BRIEF DESCRIPTION OF THE INVENTION

An object of the invention is to avoid the problem described above and to provide means for limiting the size of transferred synchronization messages. The objects of the invention are achieved with a method, a synchronization system, synchronization devices, and computer program products which are characterized by what is disclosed in the independent claims. The preferred embodiments of the invention are disclosed in the dependent claims.

The invention is based on determining maximum message size for synchronization messages. A first device specifies a maximum message size for synchronization messages to be sent to the first device and transmits information on the maximum message size to a second device. The second device transmits to the first device synchronization messages that do not exceed the maximum message size.

The arrangement of the invention has the advantage that the reliability of synchronization is improved as the problems caused by too large synchronization messages are avoided. If there is a large amount of synchronization data to be transferred, the data can be divided into multiple synchronization messages according to the capabilities of the receiving device.

The term 'synchronization message' refers generally to messages composed at the application layer by a synchronization application entity and comprising synchronization-related data. The synchronization messages are sent to lower layers (transport layer) for transmission, where they are changed into transport layer packets. According to a preferred embodiment of the invention, the SyncML protocol is used. Thus the SyncML synchronization message may contain SyncML commands, as well as the related synchronization data and meta information.

According to a preferred embodiment of the invention, the maximum messages sizes are determined in both devices of a synchronization session and the smaller value is chosen as the maximum message size for synchronization messages in both directions. This embodiment further improves the reliability of the synchronization session.

According to another preferred embodiment of the invention, the first device is a mobile station and the second device is a synchronization server. Thus the limited resources, especially temporary memory resources, of mobile stations can be taken into account already at the synchronization application level.

According to yet another preferred embodiment of the invention, the maximum message size is determined based on the limitations of a transport layer providing transport of the synchronization messages. This allows the limitations of intermediary devices, such as a WAP gateway, to be considered when determining the maximum message size for synchronization messages.

BRIEF DESCRIPTION OF THE DRAWINGS

The invention will be described in greater detail by means of preferred embodiments with reference to the accompanying drawings, in which.

DETAILED DESCRIPTION OF THE INVENTION

In the following, the preferred embodiment of the invention will be described in a system supporting the SyncML standard, without limiting the invention thereto.

Figure 1:
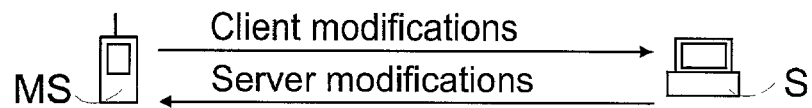
FIG. 1 illustrates synchronization according to the SyncML synchronization protocol.
Figure 2A:
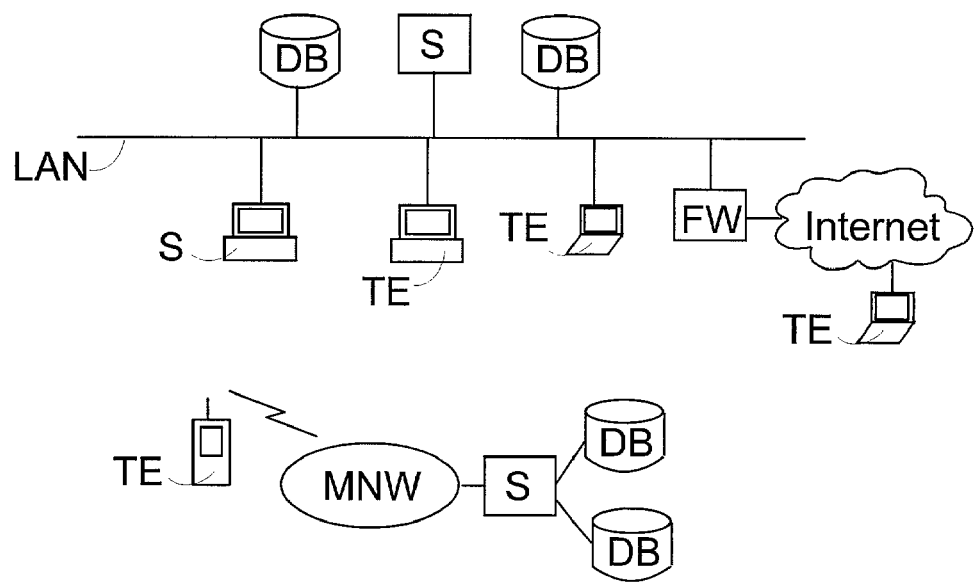
FIG. 2a illustrates a wireless network and a local area network.

FIG. 2a illustrates a networked system where data of databases DB and terminals TE can be synchronized. In respect of synchronization the terminal TE functions as a client device. FIG. 2a shows two examples. In the first one there are terminals TE, databases DB and synchronization servers S connected to a local area network LAN. The terminal TE connected to the network LAN comprises a functionality for communicating with the devices of the network LAN, e.g. a network card and software which controls data transmission. The local area network LAN can be a local area network of any type and the TE can also communicate with the server S via the Internet, typically through a firewall FW. In the second example a terminal TE, a synchronization server S and databases DB are connected to a mobile network MNW. The terminal TE connected to the network MNW comprises a mobile station functionality for communicating wirelessly with the network MNW. The mobile network MNW can be any prior art wireless network, such as a network supporting the GSM service, a network supporting also the GPRS service (General Packet Radio Service), a third-generation mobile communication network, such as a UMTS network (Universal Mobile Telecommunications System), a wireless local area network WLAN or a private network. It should be noted that the server S can also function as a database DB, even though in FIG. 2a the servers S and the databases DB are shown separately for the sake of clarity. Thus the term 'database' is to be understood broadly as referring to a data collection of any data source or data storage that can be updated by one or more applications.

Figure 2B:
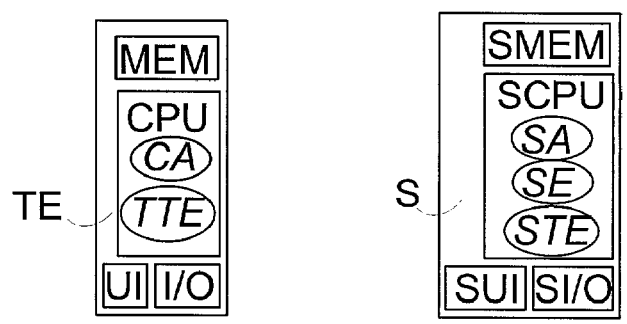
FIG. 2b illustrates a SyncML client and a SyncML server.
Figure 3:
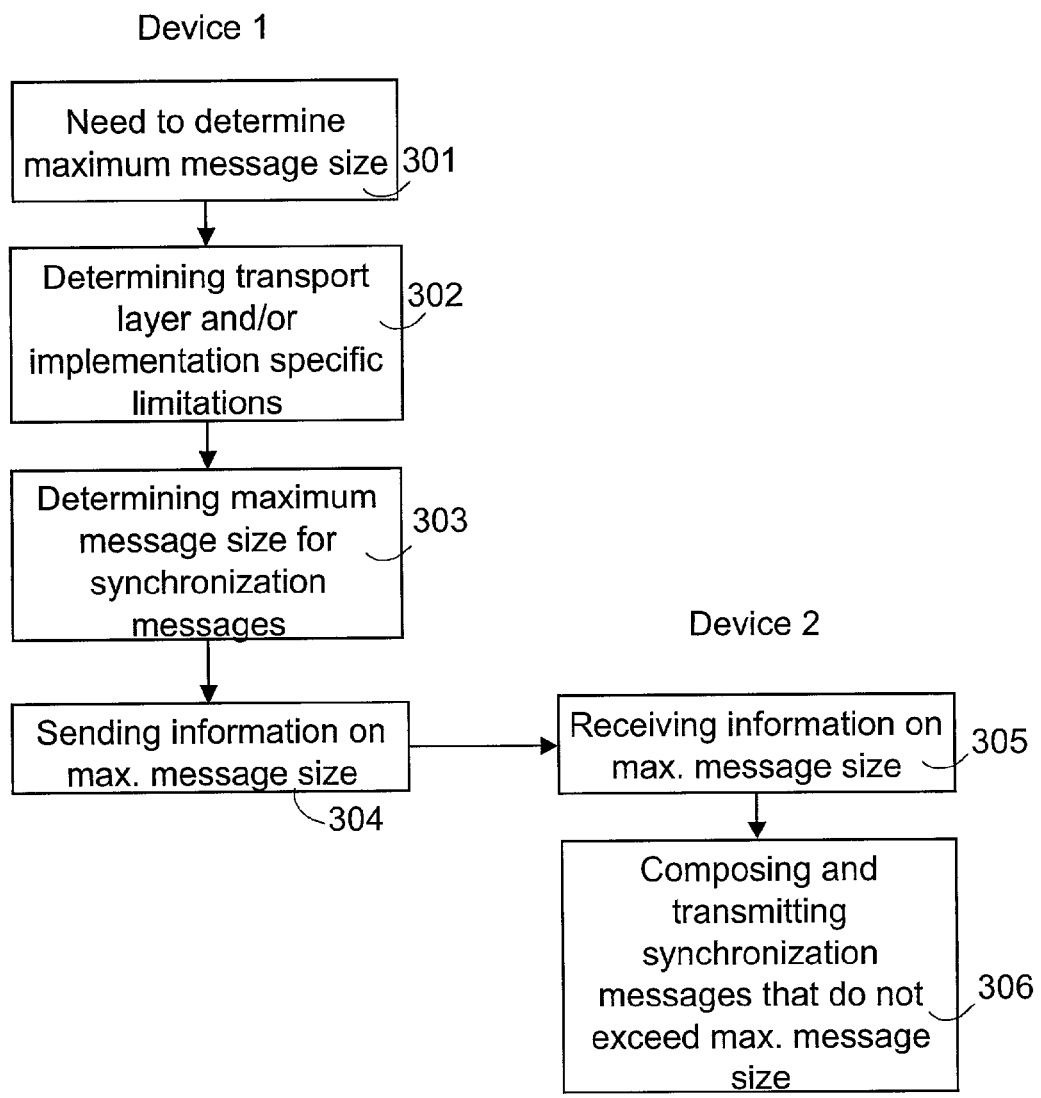
FIG. 3 illustrates a method according to a preferred embodiment of the invention.
Figure 4:
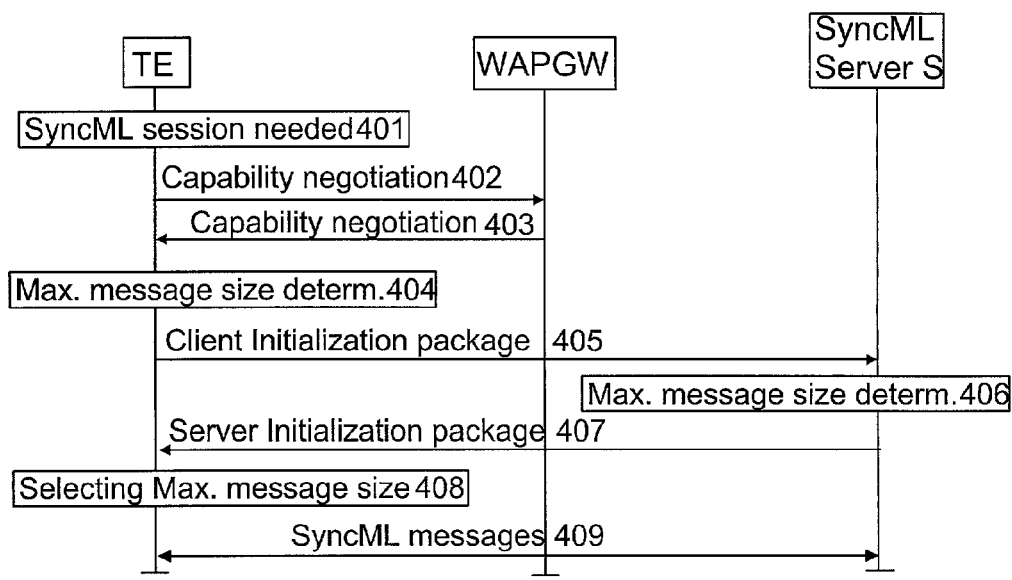
FIG. 4 is a signaling chart illustrating signaling events according to preferred embodiments of the invention.

As illustrated in FIG. 2b, the terminals TE (in wired networks LAN and in wireless networks MNW) and the servers S comprise a memory MEM; SMEM, a user interface UI; SUI, I/O means I/O; SI/O for arranging data transmission and a central processing unit CPU; SCPU, which comprises one or more processors. The memory MEM; SMEM includes a nonvolatile portion for storing applications controlling the central processor (CPU; SCPU) and a volatile memory portion for data processing. The memory MEM of the TE (which in this example is the database to be synchronized) and the memory of the databases DB store application data which are to be synchronized. A client agent CA providing the application layer functionality according to the invention is preferably implemented by executing a computer program code stored in the memory MEM in the CPU. The synchronization server S provides a synchronization agent SA and a synchronization engine SE to provide the synchronization application layer functionality. The TE and the S further comprise protocol entities providing the transport means for SyncML application layer data, especially the transport layer protocol entities TTE and STE utilizing the I/O means I/O; SI/O. The transport layer generally refers to a layer which provides the synchronization application layer with a reliable logical data transmission connection (not necessarily a protocol of the transport layer according to the OSI model, such as the TCP). The computer program code, when executed in the central processing unit CPU and the SCPU, causes the terminal TE and the synchronization server S to implement the inventive means. Embodiments of these means are illustrated in FIGS. 3 and 4. The computer programs can be embedded or obtained via a network and/or stored in memory means, such as a floppy disk, a CD ROM or other external memory means, from which they can be loaded into the memory MEM, SMEM. It is also possible to use hardware solutions or a combination of both software and hardware solutions to implement the inventive means.

FIG. 3 illustrates a method according to a preferred embodiment of the invention. As a need for determining the maximum message size exists 301 in a first SyncML device (either the SyncML client TE or the server S), transport layer-specific and/or SyncML implementation-specific limitations are determined 302. The need for determining the maximum message size 301 typically exists as a SyncML session is initiated, but it is possible to determine the maximum message size at any stage of the SyncML session. The term 'synchronization session' generally refers to the end-to-end communication between at least two synchronization protocol entities for synchronizing data between at least two devices, without being limited to the SyncML session. The SyncML implementation-specific limitations may be limitations affecting the functions of the SyncML application entity caused by the chosen hardware and/or software solutions. Limitations caused by software solutions may include the limitations of the SyncML client agent, server agent or the synchronization engine. The size of the available memory for the SyncML application entity (CA, SA) is one important factor that can be considered. Implementation specific limitations may be caused by the processor CPU, SCPU itself. In mobile devices, the processor may be so slow that the SyncML application needs to limit the message size in order to avoid time-outs, i.e. in order to process received SyncML messages and to reply to them quickly enough. In SyncML server devices, the limitations are typically caused by software solutions.

The transport layer-specific limitations refer to transport layer-specific limitations caused by the implementation of the transport layer service in the device 1 determining the maximum SyncML message size or in some other device (device 2) providing transport layer services for the SyncML messages. The SyncML application entity (CA, SA) may request transport layer-specific limitations from the transport layer protocol entity (TTE, STE). The transport layer protocol entity (TTE, STE) may preferably determine the maximum message size that can be used in the transport protocol layer and inform the SyncML application entity (CA, SA) about it. Also the transport layer application entity (TTE, STE) specific limitations may limit the maximum message size. For instance, the available memory of an HTTP client can be taken into account.

The maximum message size is then determined 303 for SyncML messages on the basis of the transport layer and/or implementation specific limitations. If there are both transport layer and implementation specific limitations for the message size, e.g. a maximum message size limit for a transport layer and a workspace memory limitation, the smallest value is chosen as the maximum message size. Information on the maximum message size is then transmitted 304 to the second SyncML device involved in a synchronization session with the first device. As the second device receives 305 this information, the SyncML application entity (CA, SA) is configured to compose and transmit 306 SyncML messages which are equal to or smaller than the maximum message size. If the amount of synchronization-related data (SyncML package) to be sent is larger than the maximum message size, the SyncML application entity (CA, SA) may split the data into multiple SyncML messages. If a single data item, e.g. an email message, is larger than the maximum message size, the SyncML application may try to compress it, discard a part of it or discard the whole data item.

The maximum SyncML message size can be specified for the request-response pair (SyncML request message—SyncML response message) or for a whole SyncML session. If the device 1 includes the maximum SyncML message size only once, it advantageously means that the receiving device 2 must follow that size during the whole SyncML session. However, the device 1 can include the maximum message size in each sent message. Then the receiving device 2 must follow the value specified in last received message when it sends the next SyncML message as a response.

It is especially important to determine the maximum size for messages being transferred to mobile stations or other portable devices, as their processing resources are fairly limited. The invention may, however, be implemented also to limit the message size for other types of synchronization devices, such as desktop computers. Device 2 in FIG. 3 may also perform the same steps as device 1, and thus the maximum message size may be informed in both directions. According to an embodiment, the smaller one of the maximum messages sizes is then selected as the used maximum message size and may be used during the whole SyncML session. It is also possible to use different values, i.e. one value for SyncML messages transmitted to device 1 and another value for messages transmitted to device 2.

In SyncML, the data synchronization operations are conceptually bound into a SyncML Package. The SyncML Package is just a conceptual frame for one or more SyncML messages that are required to convey a set of data synchronization semantics. A SyncML message is a well-formed, but not necessarily valid, XML document. The document is identified by the SyncML root or document element type. This element type acts as a parent container (i.e. a root element type) for the SyncML message. The SyncML message consists of a header, specified by the SyncHdr element type, and a body, specified by the SyncBody element type:

```
<SyncML>
    <SyncHdr>
    ...
    </SyncHdr>
    <SyncBody>
    ...
    </SyncBody>
</SyncML>
```

As is well known for the XML language, an element begins with a start-tag (e.g. <section>) and ends with an end-tag (</section>), and it can contain text or other elements. The SyncML header SyncHdr specifies routing and versioning information about the SyncML message. The SyncML body is a container for one or more SyncML Commands. The SyncML Commands are specified by individual element types. The SyncML Commands act as containers for other element types that describe the specifics of the SyncML command, including any synchronization data or meta information.

A SyncML DTD (Document Type Definition) defines the XML document type used to represent a SyncML message. The DTD determines the used tags, structural proportions of the elements (!ELEMENT) between the tags, and other XML document definitions. SyncML messages typically refer to a DTD that is already known (it is also possible to include DTD in transferred SyncML messages). The maximum message size is preferably determined in a header part (SyncHdr) of a SyncML message. The content model of the SyncHdr element in the SyncML DTD may be defined as follows:

<!ELEMENT SyncHdr (VerDTD, VerProto, SessionID, MsgID, Target, Source, RespURI?, NoResp?, Cred?, Meta?)>

The question mark '?' denotes that the particular element is optional. 'VerDTD' specifies the version identifier of the SyncML representation protocol specification used to represent the SyncML message, 'VerProto' specifies the version identifier of the SyncML synchronization protocol specification used with the SyncML message, 'SessionID' specifies the identifier of the SyncML session associated with the SyncML message, 'MsgID' specifies a SyncML session-unique identifier for the SyncML message, 'Target' specifies target routing or mapping information, 'Source' specifies source routing or mapping information, 'RespURI?' specifies the URI that the recipient must use for any response to this message, 'NoResp?' indicates that the originator does not want a response status to be sent back in the response message and 'Cred?' specifies an authentication credential for the originator. The 'Meta?' element may be used to convey meta information about the SyncML messages, it may be used especially to convey information on the maximum byte size of a SyncML response. Annex 1 illustrates an example of the SyncHdr container element in which the maximum message size is specified.

The SyncML synchronization protocol can be implemented utilizing various transport layer protocols, such as the HTTP protocol, the WSP protocol of the WAP standard, the OBEX protocol used for cable connections, such as USB or RS-232, for short-range radio frequency connections (Bluetooth) or for infrared connections (IrDA), the TCP/IP stack or the transport layer service which is offered by the e-mail protocol (SMTP). Transfer at the lower layers can be performed according to the underlying network using e.g. short messages or other signaling type transmission methods (e.g. USSD; Unstructured Supplementary Service Data), circuit-switched data calls or packet-switched data transfer services.

According to an embodiment, the HTTP protocol is used for providing the transport layer transmission. In this embodiment the SyncML implementation specific limitations are advantageously used to determine the maximum message size. For instance, the amount or a part of the available workspace of the SyncML application is taken as the maximum message size. It is also possible to consider transport layer limitations, such as the limitations caused by the HTTP server software or the available memory for an HTTP client.

According to another embodiment, the OBEX protocol is used to offer the transport layer transmission. In this embodiment, the maximum OBEX packet length is the transport layer specific limitation and may be taken as the maximum SyncML message size. During OBEX link establishment, a CONNECT packet is sent between the parties of the OBEX session (OBEX client and OBEX server) and it indicates the maximum size OBEX packet that the device can receive. The OBEX client and server may have different maximum lengths. For a more detailed description of the OBEX link establishment, reference is made to Chapters 3.3.1.3 and 3.3.1.4 on page 24 of OBEX specification "*IrDA Object Exchange Protocol*, IrOBEX", version 1.2, Mar. 18, 1999, Infrared Association. The SyncML implementation-specific limitations may also be considered when determining the maximum message size.

According to yet another embodiment, the WSP protocol is used to offer the transport layer transmission. In this embodiment the WSP layer maximum message size determines the transport layer specific limitation to the maximum SyncML message size. The SyncML application entity (CA, SA) requests maximum message size in a WSP session from the WSP entity (TTE and/or STE in FIG. 2*b*). The WSP message size may be found out using a capability negotiation mechanism. The capability negotiation is used for agreeing on WSP session functionality and protocol options. WSP session capabilities can be negotiated during the WSP session establishment. Capability negotiation allows a WSP server application to determine whether a WSP client can support certain protocol facilities and configurations. For a more detailed description of the WSP capability negotiation, reference is made to WAP specification WAP-230-WSP "*Wireless Session Protocol Specification*", July 2001, Chapter 6.3.2.1, "*Capability Negotiation*", pages 20-22.

It should be noted that more than one transport protocols can be used in communication between the SyncML client TE and server S and that thus the server and the client may determine the maximum SyncML message size differently. For instance, an OBEX-link may be used between a mobile station and a PC and a HTTP-connection may be used between the PC and a synchronization server.

FIG. 4 is a signaling diagram illustrating a preferred embodiment in which a WAP stack is used between a TE and a WAP gateway WAP GW, and an HTTP/TCP/IP stack is used between the WAP gateway and the synchronization server S. When there is a need 401 in the TE to synchronize data of the databases (e.g. MEM, DB), the SyncML application entity (CA in FIG. 2*b*) requests the maximum message size from the WSP entity (TTE in FIG. 2*b*) and to activate a transport layer connection to the WAP gateway WAP GW and further to the SyncML server. The connection is established (a WSP session to the WAP GW and an HTTP connection from the WAP GW to the SyncML server S). The WSP capability negotiation is used 402, 403 to determine the maximum message size the WAP gateway is able to handle and, according to a preferred embodiment, this message size is also taken 404 as the maximum message size for SyncML messages to the TE. The TE may also take other limitations into account, such as the memory limitations or the client message size on the WSP layer, i.e. the maximum message size that can be sent to the client during the SyncML session.

As the transport layer connection is established between the server S and the TE, the TE transmits 405 a client initialization package to the server S in one or more SyncML messages (not exceeding the server maximum message size). The client initialization package informs the synchronization server S of the maximum message size, the databases whose data are to be synchronized, and the type of synchronization to be used. The client initialization package typically also includes authentication information and information on the services and device features supported by the terminal TE.

When the terminal TE has specified the maximum SyncML message size, the SyncML server S synchronizing with the terminal may not specify the maximum message size if there are no limitations from its side for the size of SyncML messages when it receives SyncML messages from the terminal. In this embodiment, the server S also determines 406 the maximum message size for SyncML messages. The server S then sends 407 to the terminal TE a server initialization package containing typical information on SyncML session initialization and the maximum message size determined by the S. The TE selects 408 the maximum message size to be used during the SyncML session in both directions by selecting the smaller one of the determined (404, 406) message sizes.

After the initialization has been finished, the data of at least one database DB defined during the initialization and the data of the terminal TE can be synchronized. The type of the synchronization can be e.g.

Two-way sync

One-way sync from client only

Refresh sync from client only

One-way sync from server only

Refresh sync from server only

Server alerted sync.

The SyncML messages transferred 409 during the SyncML session do not exceed the maximum message size. It is possible, however, to change the message size during the session by including a new maximum message size in the transferred message. It should be noted that, unlike in FIG. 4, already the server S may compare the maximum message sizes and select the used maximum message size.

According to an embodiment, a minimum limit may also be specified for synchronization messages to ensure efficiency. The limit may be e.g. 3000 bytes. Thus, if a maximum message size under 3000 bytes is determined or requested, 3000 bytes is selected (408) as the maximum message size.

It should be noted that the functions illustrated in FIG. 4 can be utilized in synchronization between more than two devices, in which case the smallest determined maximum message size is preferably used. Unlike in FIG. 4, synchronization can also be started without separate initialization messages. In that case initialization is performed simultaneously with synchronization, during which also the information on the maximum message size may be transferred. In that case the number of messages to be sent during synchronization can be reduced.

In addition to the description above, the transport layer-specific limitations may also include lower layer specific limitations, e.g. taking into account the available bandwidth over a wireless connection. The transport layer entity (TTE, STE) may request these limitations from the lower layer protocol entities.

It will be obvious to a person skilled in the art that as the technology advances, the inventive concept can be implemented in a number of ways. The invention and its embodiments are thus not limited to the examples described above but may vary within the scope of the claims.

ANNEX 1

```
<SyncHdr>
    <VerDTD>1.0</VerDTD>
    <VerProto>SyncML/1.0</VerProto>
    <SessionID>1</SessionID>
    <MsgID>1</MsgID>
    <Target><LocURI>http://www.sync-server. com</LocURI>
    </Target>
    <Source><LocURI>IMEI:123456789012345<
    /LocURI></Source>
    <Meta><!--The Meta is now used to indicate the maximum
SyncML message size, which a terminal can receive.-->
        <MaxMsgSize xmlns = 'syncml:metinf'>5000</MaxMsgSize>
        </Meta>
    </SyncHdr>
```

What is claimed is:

1. A method, comprising:
specifying, in a first device, a maximum message size for synchronization messages, complying with a syncml standard, associated with the first device,
transmitting information on the maximum message size from the first device to a second device, and
receiving at the first device one or more synchronization messages with a size equal to or smaller than the maximum message size specified in the first device, wherein the first device is functioning as a syncml client and the second device is functioning as a syncml server, or the first device is functioning as a syncml server and the second device is functioning as a syncml client.

2. A method as claimed in claim 1, further comprising:
receiving at the first device a maximum message size for synchronization messages associated with the second device, and
transmitting to the second device synchronization messages with a size equal to or smaller than the received maximum message size for synchronization messages associated with the second device.

3. A method as claimed in claim 1, wherein
a maximum message size for synchronization messages associated with the second device is received at the first device,
the maximum message sizes for the first device and the second device are compared,
the smaller one of the maximum message sizes is selected for a synchronization session between the first device and the second device, and
synchronization messages which are equal to or smaller than the selected message size are exchanged between the first device and the second device.

4. A method as claimed in claim 1, wherein the information on the maximum message size is transmitted during synchronization session initialization in an initialization message.

5. A method as claimed in claim 1, wherein the maximum message size is specified based on implementation specific limitations of the first device affecting functionality of the synchronization application entity of the first device.

6. A method as claimed in claim 1, wherein the maximum message size is specified based on limitations of a transport layer providing transport of the synchronization messages.

7. A method as claimed in claim 6, wherein the transport layer is based on a (wireless application protocol) between the first device and a wireless application protocol gateway, and the maximum message size is determined based on the maximum message size the wireless application protocol gateway is capable of transferring.

8. A method according to claim 1, wherein the information on the maximum message size is indicated in a meta element of a synchronization message header.

9. An apparatus, comprising:
a processing unit configured to establish a synchronization session with a synchronization device,
specify a maximum message size for synchronization messages complying with a syncml standard associated with said apparatus, and
transmit information on the maximum message size to the synchronization device,
wherein, said apparatus is configured to function as a synchml client or syncml server.

10. An apparatus as claimed in claim 9, wherein the processing unit is configured to specify the maximum message size on the basis of implementation specific limitations of the apparatus affecting the functionality of synchronization application entity of the apparatus.

11. An apparatus as claimed in claim 9, wherein the processing unit is configured to specify the maximum message size on the basis of limitations of a transport layer providing transport of the synchronization messages.

12. An apparatus as claimed in claim 9, wherein the processing unit is configured to transmit the information on the maximum message size, during synchronization session initialization, in an initialization message.

13. An apparatus device as claimed in claim 9, wherein the processing unit is configured to indicate the information on the maximum message size in a meta element of a synchronization message header.

14. A synchronization device comprising:
means for functioning as a syncml client or a syncml server,
means for establishing a synchronization session with another synchronization device,
means for receiving information on a maximum message size for synchronization messages, complying with a syncml standard, associated with the other device, and
means for transmitting to the other device synchronization messages with size equal to or smaller than the maximum message size.

15. A computer program product, embedded in a computer readable medium, comprising:
computer code configured to establish a synchronization session between a first synchronization device and a second synchronization device,
computer code configured to specify a maximum message size for synchronization messages complying with a syncml standard, associated with said first synchronization device, and
computer code configured to transmit information on the maximum message size to the second synchronization device, wherein the first synchronization device is functioning as a syncml client and the second synchronization device is functioning as a syncml server, or the first synchronization device is functioning as the syncml server and the other synchronization device is functioning as the syncml client.

16. A computer program product according to claim 15, the computer program product comprising code for transmitting the information on the maximum message size, during synchronization session initialization, in an initialization message.

17. A computer program product according to claim 15, the computer program product comprising code for indicating the information on the maximum message size in a meta element of a synchronization message header.

18. A computer program product, embedded in a computer readable medium, comprising:
computer code configured to establish a synchronization session between a first synchronization device and a second synchronization device,
computer code configured to receive information on a maximum message size for synchronization messages, complying with a syncml standard, associated with the second synchronization device, and
computer code configured to transmit to the second synchronization device synchronization messages, complying with syncml standard, with size equal to or smaller than the maximum message size, wherein the first synchronization device is functioning as a syncml client and the second synchronization device is functioning as a syncml server, or the first synchronization device is functioning as the syncml server and the second synchronization device is functioning as the syncml client.

19. A computer program product according to claim 18, the computer program product comprising code for receiving the information on the maximum message size, during synchronization session initialization, in an initialization message.

20. A computer program product according to claim 18, the computer program product comprising code for receiving the information on the maximum message size in a meta element of a synchronization message header.

21. A synchronization system comprising a first synchronization device and a second synchronization device, wherein
the first device is configured to specify a maximum message size for synchronization messages to be sent to the first device and the second device is configured to determine a maximum message size for synchronization messages to be sent to the second device,
the first device is configured to transmit to the second device information on the maximum message size for synchronization messages to be sent the first device, and
the second device is configured to compare the maximum message sizes for the first device and the second device,
the second device is configured to select the smaller size among the maximum message sizes,
the second device is configured to inform the first device of the selected maximum message size, and
the first device and the second device are configured to transmit synchronization messages which are equal to or smaller than the selected message size.

22. An apparatus comprising:
means for establishing a synchronization session with a synchronization device,
means for specifying a maximum message size for synchronization messages, complying with a syncml standard, associated with the synchronization device, and
means for transmitting information on the maximum message size to the synchronization device, wherein the apparatus is configured to function as a syncml client or syncml server.

23. An apparatus, comprising:
a processing unit configured to
receive information on a maximum message size for synchronization messages, complying with a syncml standard, associated with a synchronization device, and
transmit to the synchronization device synchronization messages, complying with the synchml standard, with a size equal to or smaller than the maximum message size,
wherein the apparatus is configured to function as a syncml client or a syncml server.

24. The apparatus as claimed in claim 23, wherein the processing unit is configured to receive the information on the maximum message size, during synchronization session initialization, in an initialization message.

25. The apparatus as claimed in claim 23, wherein the processing unit is configured to receive the information on the maximum message size in a meta element of a synchronization message header.

26. A method comprising:
receiving, at a first synchronization device, information on a maximum message size for synchronization messages, complying with a syncml standard, associated with a second synchronization device; and
transmitting to the second synchronization device synchronization messages, complying with the synchml standard, with a size equal to or smaller than the maximum message size,
wherein the first synchronization device is functioning as a syncml client and the second synchronization device is functioning as a syncml server, or the first synchronization device is functioning as a syncml server and the second synchronization device is functioning as a syncml client.

27. The method as claimed in claim 26, wherein the information on the maximum message size is received, during synchronization session initialization, in an initialization message.

28. The method as claimed in claim 26, wherein the information on the maximum message size is received in a meta element of a synchronization message header.

* * * * *

UNITED STATES PATENT AND TRADEMARK OFFICE
CERTIFICATE OF CORRECTION

| | | |
|---|---|---|
| PATENT NO. | : 7,570,668 B2 | |
| APPLICATION NO. | : 09/971213 | |
| DATED | : August 4, 2009 | |
| INVENTOR(S) | : Mettala et al. | |

It is certified that error appears in the above-identified patent and that said Letters Patent is hereby corrected as shown below:

Col. 9, line 63, in Claim 7, delete "(wireless application protocol)" and insert --wireless application protocol-- therefore.

Col. 10, line 27, in Claim 13, after "apparatus" delete "device".

Signed and Sealed this

Twenty-second Day of December, 2009

David J. Kappos
*Director of the United States Patent and Trademark Office*